United States Patent [19]
Le Moal et al.

[11] 3,953,827
[45] Apr. 27, 1976

[54] METHOD OF DETERMINING THE ANGULAR POSITION OF A TOWED MARINE SEISMIC CABLE AND APPARATUS FOR CARRYING OUT SAID METHOD

[75] Inventors: Robert Le Moal, Louveciennes; Jacques Cholet, L'Etang-La-Ville; Daniel Saussier, Elisabethville-Epone, all of France

[73] Assignee: Entreprise de Recherches et d'Activites Petrolieres (E.R.A.P.), Paris, France

[22] Filed: Feb. 19, 1974

[21] Appl. No.: 443,251

[30] Foreign Application Priority Data
Feb. 21, 1973 France .................... 73.06123

[52] U.S. Cl. .................. 340/7 R; 340/3 T; 340/7 PC
[51] Int. Cl.² .................................. G01V 1/00
[58] Field of Search .......... 340/3 T, 7 R, 7 PC; 181/109, 110, 112

[56] References Cited
UNITED STATES PATENTS

| | | |
|---|---|---|
| 3,525,072 | 8/1970 | Born et al. .................... 340/7 PC |
| 3,581,273 | 5/1971 | Hedberg ........................ 340/7 PC |
| 3,794,965 | 2/1974 | Charske ........................ 340/7 PC |
| 3,840,845 | 10/1974 | Brown ........................... 340/7 R |

FOREIGN PATENTS OR APPLICATIONS

693,759   9/1964   Canada ........................... 340/3 T

*Primary Examiner*—Maynard R. Wilbur
*Assistant Examiner*—S. C. Suczinski
*Attorney, Agent, or Firm*—Brisebois & Kruger

[57] ABSTRACT

A method and apparatus for determining the position of a plurality of seismic echo receivers on a towed cable by interpolating values obtained by measuring, by means of at least one device positioned among said receivers, the angle between the tangent to the cable and a fixed and known direction. The measuring device can also include apparatus for measuring its depth and its distance from a generator of seismic waves. This provides for more effective use of processes which involve the addition of seismic traces in marine seismic prospecting.

11 Claims, 8 Drawing Figures

METHOD OF DETERMINING THE ANGULAR POSITION OF A TOWED MARINE SEISMIC CABLE AND APPARATUS FOR CARRYING OUT SAID METHOD

SUMMARY OF THE INVENTION

The present invention relates to a method and apparatus for determining the angular position of a towed seismic marine cable customarily called a "streamer" as well as its depth, and to record, for example, on a central magnetic recording mechanism, data identifying the position in space of a plurality of points on said towed cable at the moment of each seismic shot.

Hydrophones positioned along the length of the streamer and especially at its end are now in use to determine the distance from the hydrophone to the point of the shot.

Manometers connected to the seismic laboratory or central station are employed to determine the depth of the different points on the towed cable.

Finally, various devices are known for indicating the direction of the end of the towed cable, or more exactly, of the float which is attached to said end, by optical sighting, limited to days when the weather is clear, by measurement on an echo radar installed on the float when the sea is a little rough, or by goniometry, utilizing a radio transmitter mounted on said float, which technique may be used in any weather.

The separate use of these measuring devices does not adequately disclose the position of the hydrophones in space so as to permit the reconstruction of the incoming seismic waves with the desired accuracy. The practical difficulties are increased with an increase in the length of the towed cables, which actually attain lengths of 3,000 to 4,000 meters and with the use of immersed cables towed at depths of 15 to 60 meters. Under these conditions the principal difficulties encountered are: In seismic reflection, in the adding of the pulses by reflecting point; and in seismic refraction, in the establishment of couplings.

The importance of the problem posed in the case of seismic reflection will now be outlined.

Figure 1:
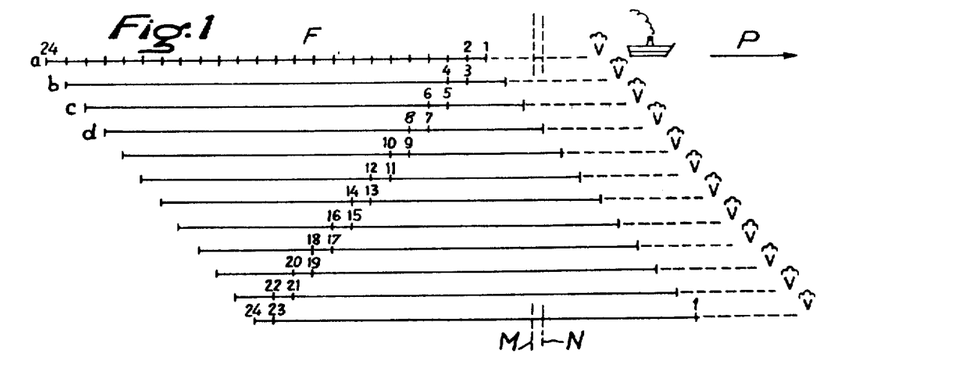
FIG. 1 is a diagram illustrating a method of adding traces corresponding to a common reflecting point.

FIG. 1 is an operating diagram illustrating the method of adding the traces corresponding to a common reflecting point, where a towed cable carrying a shot source 5 and 24 hydrophones 1–24 is straight behind a boat moving along the profile line P which is the subject matter of the seismic study. The horizontal lines of FIG. 1, are shown spaced apart for purposes of explanation, and represent the respective positions of the cable at the instant of successive shots $a, b, c, d, \ldots$ of source S. The boat is moved at a predetermined speed, in the usual manner, and the shots $a, b, c, d, \ldots$ occur at equal time intervals such that the distance traveled by the boat and cable between each shot is essentially equal to the distance between adjacent hydrophones. With this shot timing there is a reflection point N for hydrophone 1 during shot $a$, which is the same as the reflection point for hydrophones 3, 5, 7, . . . during the successive shots $b, c, d, \ldots$ Similarly, there is a common reflection point M for hydrophone 2 during shot $a$, and hydrophones 4, 6, 8, . . . , during successive shots $b, c, d, \ldots$ In the arrangement of FIG. 1 it is assumed that the cable is straight behind the boat, that there are no currents or other disturbing forces, and that the boat moves along the profile line P. When these conditions are correct, reflections from the same point N are received by the successive odd numbered hydrophones (1, 3, 5, . . .) of FIG. 1, and reflections from the same point M are received by the successive even numbered hydrophones (2, 4, 6, . . .) shown at FIG. 1, during the successive shots $a, b, c, \ldots$, etc. By this procedure, two groups of traces, one odd and one even, corresponding to successive shots $(a, b, c, d, \ldots)$ are added.

Figure 2:
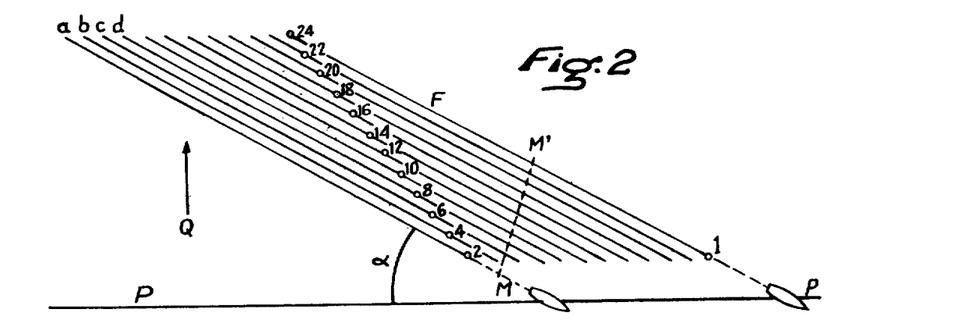
FIG. 2 is a diagram illustrating the effect of a current on the angular position of the towed streamer and the effect on the traces.

A uniform current is represented by the arrow Q on FIG. 2, with the boat travelling so as to follow the profile P, but the towed cable, which in a first approximation is still presumed to be straight, lies at an angle of deviation $\alpha$ with respect to the profile P. The reflecting point of the trace obtained from hydrophone 4 during the shot $b$ is not the same as that (M) of the trace from hydrophone 2 during the shot $a$. It will be observed that there is a spacing of the reflecting points which, projected on the horizontal plane, is represented by the line M, M'.

Figure 3:
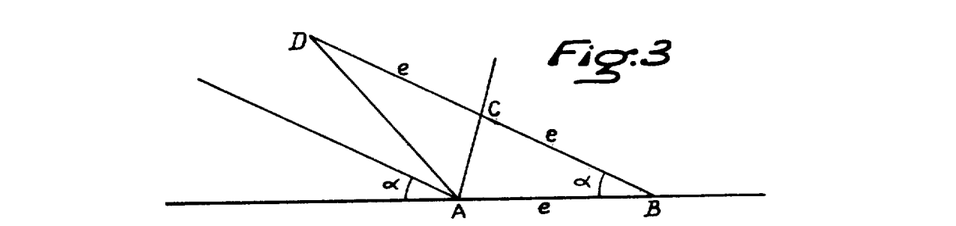
FIG. 3 illustrates the calculation of the distance between two reflecting points.

FIG. 3 shows how to calculate the distance between the reflecting points A and C corresponding to a movement of the boat by a distance $e$, (A to B in FIG. 3). The trace resulting from the reflection from A is to be added to the trace resulting from the reflection from C and which is picked up at the following shot by a hydrophone at D, spaced at a distance $2e$ along the towed cable behind the boat. Since ABC is an isosceles triangle:

$$AC = 2e \sin \frac{\alpha}{2}$$

where : $e$ = distance moved by boat between shots
$\alpha$ = angle of deviation of boat relative to profile line It is assumed that the twelve component traces (from either the 12 even numbered hydrophones or the 12 odd numbered hydrophones of FIG. 1) carry an identical useful seismic signal and that the dynamic corrections have been made under the best conditions.

If the reflecting point has, along the direction AC, a time gradient $g$ (expressed for example in milliseconds per kilometer) along the same seismic reflection the travel time $t$ will vary from one component trace to the next one by $\Delta t$:

$$\Delta t = g \times 2e (\sin \alpha/2) \times 10^{-6}$$

The cut off frequency at − 3 decibels, attenuation 30%, $$Fc = \frac{1}{2n\Delta t}$$

(where $n$ = number of Component traces)
if $n = 12$;

$$Fc = \frac{1}{24 \Delta t}$$

and the frequency $$\frac{1}{12 \Delta t}$$

is suppressed

In the practical case of a space of 100 meters between traces, with twelve-fold coverage, the cut-off frequency Fc is:

$$Fc = \frac{10^4}{48} \cdot \frac{1}{g.\sin \alpha/2}$$

With an angle of deviation $\alpha = 30°$ and a time gradient along MM' of 20 milliseconds per kilometer, or with an average speed of 3,000 meters per second, angle of inclination of 30 meters per kilometer, the cut-off frequency is 40 cycles per second and the 80 cycles per second component of the signal is eliminated. This is also the case when there is deviation of 10° with an angle of inclination of 90 meters per kilometer.

As the seismic frequencies are spaced from 10 to 100 cycles per second it will be seen that the additions of the traces take the deviation only imperfectly into account, if at all, and there is a risk that the signal will be destroyed, which risk is reduced by operating in accordance with the proposed method.

The present invention makes it possible to reduce these difficulties by providing, either in the clear, or in numerical form, the information necessary and sufficient to define the position in space of a plurality of points along the towed cable at the moment of each shot.

The present invention makes it possible to effectively apply improved methods of adding seismic traces to marine seismic prospecting, and especially those described in French patents Nos. 2,041,016 and 2,061,831.

The process according to the invention of determining the position in space of a plurality of seismic echo receivers, such as hydrophones, distributed along the length of a towed cable is characterized by the steps of determining the position of each receiver by the interpolation of values obtained by measuring with at least one measuring device positioned between the plurality of seismic echo receivers, the angle which the tangent to the cable at the location of the measuring device makes with a fixed and known direction.

The position in space of the measuring devices may be calculated step by step by assimilating the part of the towed cable located between two successive measuring devices to an arc of a circle the length of which is known from the construction of the streamer, while the angular value of the arc is determined from the differences between the angles measured by the successive measuring devices between the tangent to the cable and a fixed and known direction.

The position in space of the seismic echo receivers is then determined by interpolation between the positions of successive measuring devices along the towed cable.

In order to obtain a more accurate measurement it is possible to also measure the distance of each measuring device from the generator of seismic waves and the depth of immersion of each measuring device.

The position in space of the measuring devices, interpositioned between a plurality of seismic echo receivers, may be obtained in a more accurate manner, by determining, through an optimization process, a function corresponding to the best curve of the streamer, taking into account the hydrodynamic conditions, having at the positions occupied by said devices, a tangent which lies at the measured angle with respect to a fixed and known direction, and such that said devices, separated from the generator of seismic waves by the measured distances, are located at the measured depth of immersion, and spaced one from another along the length of the towed cable by fixed distances determined by the construction of the streamer.

The coordinates of the seismic echo receivers, the distribution of which along the towed cable is known, are then calculated by interpolation on the curve thus determined. In the various embodiments, the measuring device attached to a towed cable for carrying out the process consists of a closed receptacle having no tendency to float (zero buoyancy), which is stabilized along its horizontal axis, which contains means for measuring the angle between the tangent to the cable at the point at which said device is located and a fixed and known direction, and means for coding and transmitting the measured values by means of electronic pulses and connections for the conductors connecting said measuring device to the central station.

The means for measuring the angle between the tangent to the cable at the location of the device and a fixed and known direction comprise, in a preferred embodiment, a potentiometric magnetic compass, but may also consist of a gyroscopic compass or any other suitable means.

In those embodiments in which a great accuracy of measurement is sought the measuring device attached to the towed cable to carry out the process may also contain means for measuring the actual distance between the measuring device and the generator of seismic waves.

In a preferred embodiment these distance-measuring means include hydrophones to determine the time interval between a shot and the arrival of the direct wave at a hydrophone, via the water. Various other embodiments are possible.

In the embodiments in which the greatest accuracy is sought the device may, moreover, be provided with means for measuring the depth of immersion of the device. The means for measuring the depth of immersion consists, in a preferred embodiment, of potentiometric manometers, but any other suitable means may be used.

In the preferred embodiments in which each device distributed among the plurality of seismic echo receivers is provided with, means for measuring the angle between the tangent to the towed cable at the point at which the device is attached and a fixed and known direction, means for measuring the distance of said device from a generator of seismic waves, and means for measuring the depth of immersion of said device, the means for controlling said measuring apparatus and for coding and transmitting the measured values include a multiplex device comprising a plurality of reversing switches, modules for detecting signal waves and controlling said multiplex device, a filter and wave form shaper for the signal furnished by the wave transmitted directly by the water to the hydrophone or other distance measuring device, and an oscillator having a modulated variable frequency and its impedence adapter, said oscillator and adapter being successively connected via the multiplex device to each of the measuring units which measure the angle, the distance from the source, and the depth of the measuring device.

The invention will be better understood from a study of the following description, given purely by way of illustration and example, and with reference to the accompanying drawings, of a preferred embodiment of apparatus for carrying out the invention.

Figure 4:
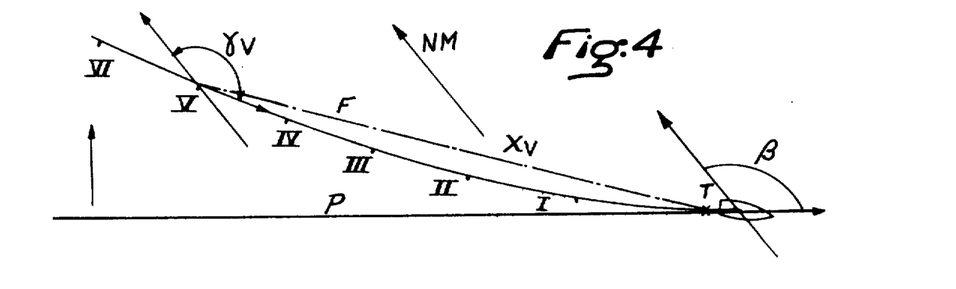
FIG. 4 is an overall schematic diagram illustrating the apparatus of this invention in use.

On FIG. 4 the diagram shows the boat following the profile line P. The towed cable, which carries a plurality, of for example, 24 longitudinally spaced seismic echo receivers (not shown), which can be equally spaced, assumes, in response to the influence of the water current, a curved position. A plurality of measuring devices, six on the drawing, numbered I, II, III, IV, V and VI, are spaced along the length of the towed cable at equal distances, each approximating one-fifth of the useful length of the towed cable. The position in space of the measuring devices, for example, the device V, is defined by three quantities, the distance $X_V$ to the point of the shot T at the back of the boat, the angle of inclination $\gamma V$ between the tangent to the towed cable at the point in question and a fixed direction such as north magnetic (NM), (while the profile P lies at an angle $\beta$ to NM), and finally the depth of the device V beneath the surface of the water.

Figure 5:
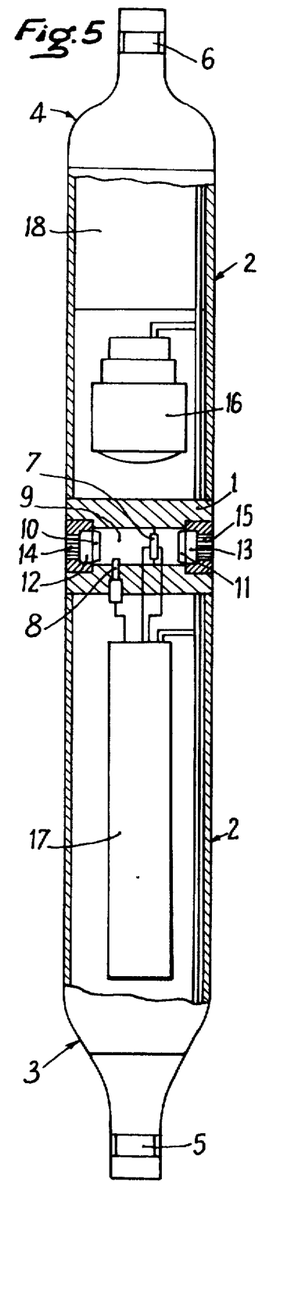
FIG. 5 is a schematic sectional view taken through the immersed measuring device.

FIG. 5 is a section through an immersable measuring device 1' which includes a metallic non-magnetic support 1 to which are attached the different parts of a removable cylindrical casing 2 provided with transition sections 3 and 4 which are reduced in diameter at each end. The radius of curvature of the rear section 3 is greater than that of the front section 4 in order to avoid turbulent passage through the water and the noise which would result. The transition sections connect the casing 2 to connectors 5 and 6 fastened to the towed cable.

Inside the casing 2, the support 1 carries a distance determing hydrophone 7, which receives the direct wave from the shot source which makes it possible to precisely calculate the distance from the measuring device in question to the shot point. The support 1 also carries a pressure measuring means, for example, a potentiometric manometer 8, which gives the depth of device 1' beneath the surface of the water.

The hydrophone 7 and the manometer 8 are positioned in a cavity 9 filled with oil and defined by the internal walls of the support and by two membranes 10 and 11 which separate the cavity 9 from two enclosures 12 and 13 containing sea water and communicating with the external sea water via ducts 14 and 15, which extend through the wall of the casing 2. The support 1 also carries an angle measuring device 16 for measuring the angle between the towed cable and an invariable and known direction or heading, and which can be, for example, a magnetic compass comprising a potentiometric device fixed to the receptacle, and a box containing the electronic circuitry 17 of the measuring device 1'. Finally, a ballast space 18 is provided, the capacity of which is such that, in operation, the longitudinal axis of the receptacle will not depart from the horizontal.

Figure 6:
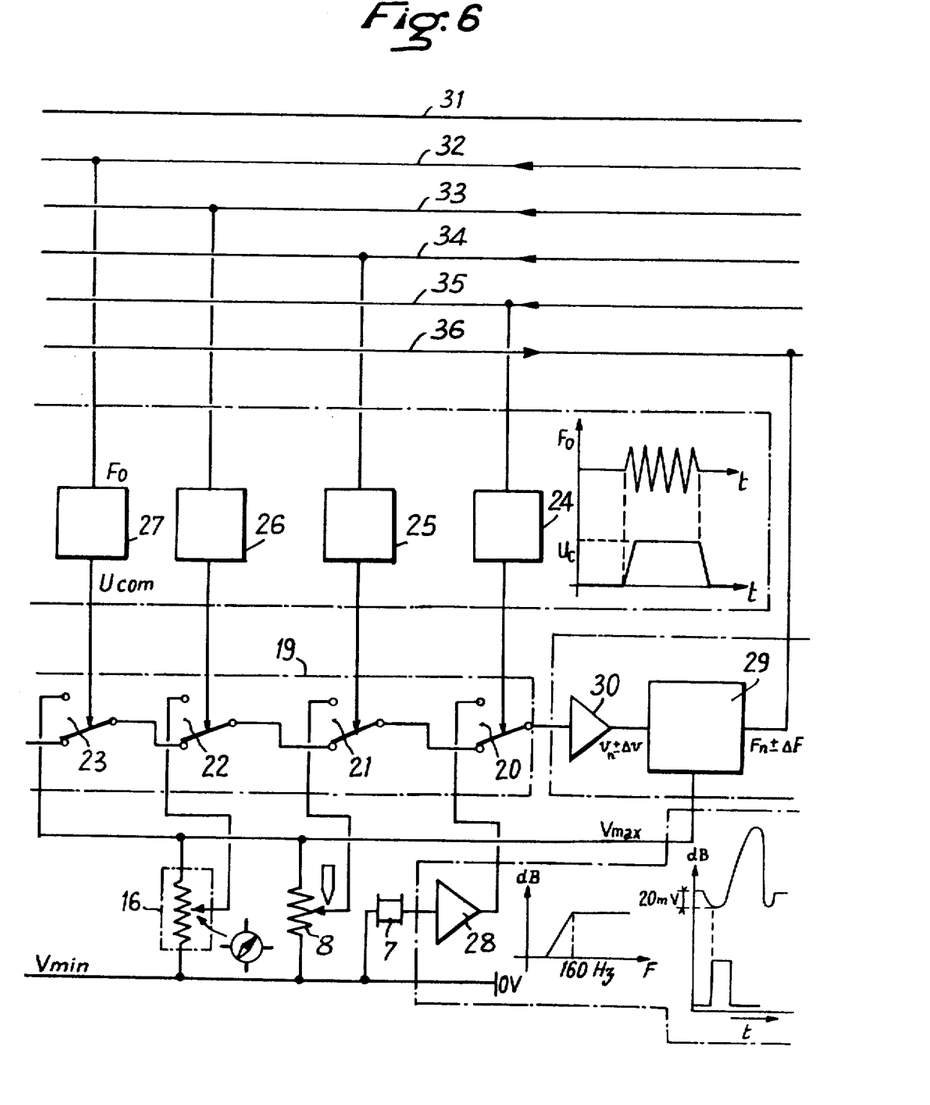
FIG. 6 is a circuit diagram of the electronics in measuring device.

FIG. 6 shows that the electronic circuitry 17 in the casing 2 of the measuring device includes:

a multiplex device 19 comprising four reversing switches 20, 21, 22 and 23, which can be electronic switches rather than the mechanical switches shown, detection modules 24, 25, 26 and 27 for detecting orders and for controlling the multiplex device 19, a filter and signal shaper 28 for the signal furnished by the wave transmitted directly by the water from the shot source to the hydrophone 7, an oscillator 29 having a variable modulated frequency and its impedence adapter 30.

On the same figure are shown, in their proper relationships with the preceeding components, the three detecting devices heretofore identified: the hydrophone 7, the depth measuring manometer 8, and the angle or heading measuring device 16. The following electrical connection lines are also shown: seismic trace line 31, reference voltage order line 32, "measure heading" order line 33, "measure depth" order line 34, "measure arrival direct wave" order line 35, and information line 36.

Figure 7:
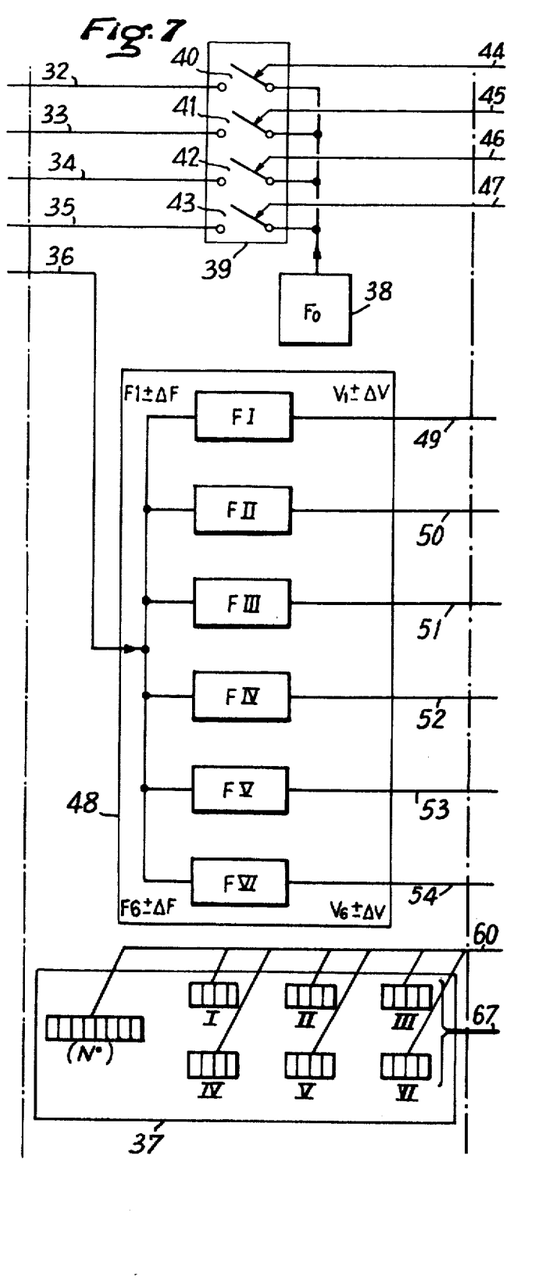
FIG. 7 shows the control unit at the operating station.

FIG. 7 shows the control panel on board the boat at the operator's position, which comprises:

a display device or register 37 for preliminary results or testing, for displaying the recording number of a shot and the six maximum waiting periods for the arrival of the direct wave at the respective measuring devices I, II, III, IV, V and VI, on the cable or streamer;

an order frequency generator 38 which supplies orders or commands through a multiplex device 39 of four switches 40, 41, 42, 43 to the lines identified on FIG. 6 by the respective numbers 32, 33, 34 and 35 when an order is received over the lines 44, 45, 46 and 47;

a discriminator assembly 48 comprising a group of six frequency demodulators, each connected to a measuring device and indicated by reference numerals F I, F II, F III, F IV, F V, F VI. These demodulators are supplied by the information line 36 and have their outputs numbered respectively 49, 50, 51, 52, 53 and 54. With each frequency demodulator is associated a preamplifier and a line transformer (not shown) making it possible to derive the information from the line 36 and also to supply direct current operating voltage to the variable frequency modulated oscillator 29 in each measuring device.

Finally there is a rheostat assembly (not shown) furnishing from a main current the different voltages required for the control panel.

Figure 8:
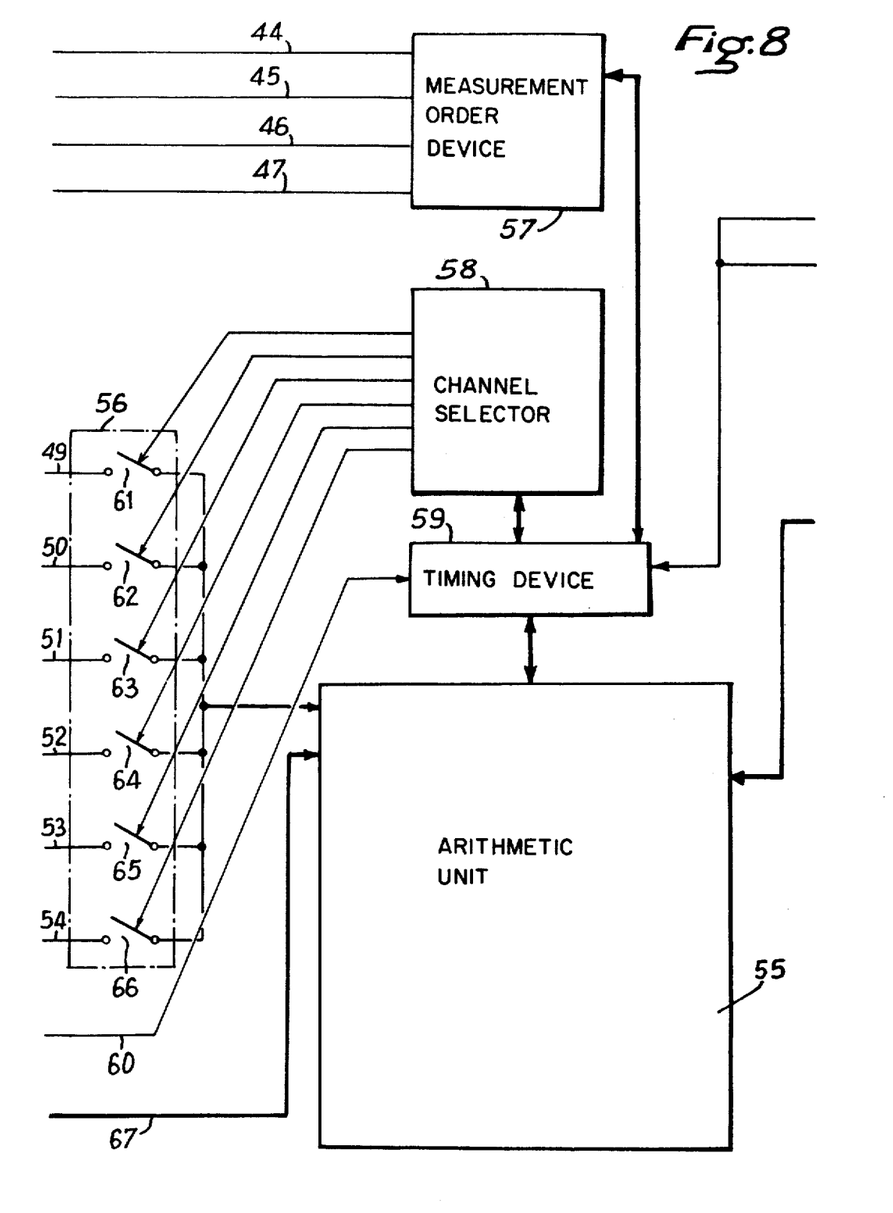
FIG. 8 is the arithmetic unit at the operating station.

FIG. 8 shows an arithmetic unit 55 carried on board the boat at the operator's station and which cooperates with a coupler 56 comprising switches 61, 62, 63, 64, 65, 66, a measurement order device 57 for introducing the measurement orders, a device 58 for introducing the channel selection orders, and a timing device 59, to form a minicomputer microprogrammed by diode type dead data storage means and having the couplers necessary to communicate with the specific peripherals of the device shown in the preceeding figures.

A front panel (not shown) carries indicators and controls making it possible to select either automatic operation or step-by-step operation, and in the latter case permit the manual input of information and instructions and the display of the results.

The timer 59 is connected by a line 60 to the display device 37 of FIG. 7. It is also connected to the device 57 for supplying measurement orders to the device 58 for supplying channel orders to the arithmetic unit 55 and to the means for automatically or manually controlling the shot (not shown).

The device 57 for supplying the measurement orders controls, through the lines 44, 45, 46, and 47, switches 40, 41, 42, 43, of the multiplex device 39 (FIG. 7). The device 58 for supplying the channel orders, controls the six switches 61, 62, 63, 64, 65 and 66 of the coupler 56. This coupler places each of the frequency demodulators F I, F II, F III, F IV, F V, F VI, of the demodulating assembly 48 of FIG. 7 selectively and successively in communication with the arithmetic unit 55.

The arithmetic unit 55 is connected to the register 37 by a line 67. The arithmetic unit is also connected to the coupler 56 and to the timer 59. It is provided with the equipment necessary to carry out the following functions for each channel, with decision as to switching to the next following channel:

treatment of the time of arrival of the direct seismic wave transmitted by the water;

treatment of the measurements of the heading and depth;

control of the display on panel 37 and the printing and recording on the central magnetic tape, which can be in digital form.

The arithmetic unit 55 and the various components of FIG. 8 are supplied with appropriate voltages from a supply line (not shown). The operation of the means which have just been described constitutes the application of a measuring process in which the following succession of operations will be described.

The order or signal starting the sequence of measurements is produced by the same control as the one initiating the seismic shot, a manual control in the case of test apparatus, and an automatic control in commercial practice. This signal or order is transmitted to arithmetic unit 55 and to the timer 59 from the arithmetic unit.

In a preliminary step the timer 59 controls the retrieval of the recording number and the maximum time delay for the arrival of the direct wave at the measuring devices, which times are displayed at display panel 37 (FIG. 7). This preliminary data is stored in a central unit of the arithmetic unit 55 (FIG. 8). The first part of the sequence consists in the measurement of the time elapsing between the shot and the arrival of the direct wave, via the water, at the hydrophone 7 of measurement device I on the towed cable.

The timer 59 signals the measurement order device 57 (FIG. 8) which transmits over the line 47 (FIG. 8) the order or signal for measuring the time interval for arrival of the direct wave, which order closes the switch 43 of the multiplex device 39 (FIG. 7). The order frequency generator 38 (FIG. 7) is thus connected to the order line 35 (FIGS. 6 and 7) and the frequency Fo of the order is transmitted along the measure distance line 35.

At the same moment the timer 59 signals the measurement order of the distances over the line 47 by means of the measurement order device 57, it signals the closing order of the switch 61 of the coupler 56 by means of the signal channel controller 58, awaiting the arrival of the direct wave, via the water, to the measurement device no. 1.

In the measuring device, for example, device 1 (constituting the whole of FIG. 6) the frequency of the generator Fo is received by the detector 24 (FIG. 6). The detector 24 controls the relay 20 of the multiplex device 19 which switches from its rest position to its (upper) operating position.

This switching of relay 20 connects hydrophone 7 to the input of the modulated variable frequency oscillator 29 through an electronic filtering device 28 which eliminates seismic waves of, for example, up to 160 Hz, and shapes the signal using a threshold which reduces noise.

The central frequency $F_n$ of the variable frequency oscillator 29 is modulated $F_n \pm \Delta F$, by the signal $Vn \pm \Delta V$ coming from the hydrophone 7 and is transmitted over the information line 36 to the discriminator assembly 48 (FIG. 7) with six frequency demodulators. The demodulator centered on the frequency $F_n$ reproduces at its output terminals the signal $(Vn \pm \Delta V)$ which is the image of the signal $(v_n \pm \Delta v)$ from the hydrophone.

The signals indicating the arrival of the direct wave are transmitted toward the central unit of the arithmetic unit 55, which analyzes them, calculates the time, directs the display or the recording, and permits the passage from channel $n$, (for example, from demodulator F I and channel 49) to channel $n + 1$, (for example, to demodulator F II and channel 50):

Either at the instant at which the direct wave arrives, if it comes in before the complete expiration of the maximum time lapse which has been assigned thereto and displayed at 37.

Or at the instant of the expiration of the maximum time lapse displayed, and in this case the absence of a measurement is indicated either on the display means or on the register. when the signal from device No. I either arrives, or the time for its expected arrival expires, timer 59 signal channel controller 58 to open switch 61 and close switch 62. This sequence continues until all the distance determining signals are received or the time for their arrival expires.

The second step in the sequence consists of the measurement of the angle between the streamer and an invariable and known direction or heading, and of the measurement of the depth.

The track order controller 58 closes the switch 61 in order to carry out the measurements on measurement device No. 1.

The measurement order controller 57 then orders a succession of four operations:

1. Opening of switches 43, 42, 41, 40 in the multiplex 39, as a way of checking on 42, 41, and 40 since only 43 was left closed at the end of the measurement of the time lapse before arrival of the direct wave. The relays 20, 21, 22, and 23 remain in the at rest position shown at FIG. 6, since no order frequency Fo reaches detection modules 24–27 when switches 40–43 are open.

However, with switches 20–23 closed the minimum reference voltage V(min) is transmitted toward the central unit of 55 through switches 20–23, oscillator 29, line 36, and the channels 49–54. The reference voltage V(min) is stored in the central unit.

2. Closure of switch 40 which causes switch 23 to switch to its upper position and complete a connection through 27 and reference order line 32 to the order frequency generator 38. With switch 23 closed a maximum reference voltage V(max) is transmitted along information line 36 to the central unit of 55 to be stored there.

3. Opening of switch 40, followed by the closing of switch 41, which causes switch 23 to open and switch 22 to close, (move up), because of the signal on line 33 from frequency generator 38.

The heading information signal obtained is in the form of an analog voltage V(heading), at the output of the heading measuring apparatus 16. The voltage V(heading) is transmitted along information line 36 and is stored in the central unit of 55. V(heading) is for example, the voltage picked up by a slider on a potentiometric detector, the slider being fixed to the magnetic needle of the compass.

4. Opening of switch 41 followed by closing of switch 42 which causes switch 22 to open and switch 21 to close, (move up), because of the signal on depth measure line 34.

A depth voltage V(depth) is, for example, picked up by a slider on a potentiometric pressure detector or manometer 8. Voltage V(depth) is sent along information line 36 and is stored in the central unit of 55.

When these four orders have been executed, the timer 59 instructs the central unit 55 to carry out the following computation:

$$\text{Value of heading in degrees} = \frac{360° \times V \text{ heading}}{V \text{ max.} - V \text{ min.}}$$

$$\text{Value of the depth in meters} = \frac{75 \, m \times V \text{ depth}}{V \text{ max.} - V \text{ min.}}$$

It then instructs the central unit 55 to either display the result or record it on the magnetic tape.

It should be noted that 360° and 75 meters correspond respectively to the maximum deviations of the heading measuring device and the pressure detector.

It is also to be noted that each signal on an order line, for example, heading order line 33, causes the heading measuring device 16 of each of the measuring device I–VI to operate simultaneously. However, because each signal from a measuring device is modulated by its frequency modulator 29 at a Frequency $F_n$, and because only a selected one of switches 61–66 is closed to select the proper channel, only the signal from one selected channel is transmitted to arithmetic unit 55 at any one time.

The cycle of measurement is repeated in an identical manner for the measuring devices II–VI by closing each of the switches 62–66 in turn.

The sequence of deviation measurements being terminated, the timer then awaits the order for the next shot.

The position of the measuring devices at the moment of each shot is the subject matter of a simplified determination by the use of a geometric construction.

From the point of the shot, situated, behind the ship, a line is drawn which makes an angle with the route of the ship which is equal to the arithmetic mean of the heading of the ship and the heading of the seismic cable at device No. I, as it has been measured by said device. Along this line the position of device No. I is fixed so that its distance to the point of the shot is equal to the length of the cord subtending an arc of a circle having a known length and a central angle equal to the difference between the heading of the ship and the heading of the seismic cable at device No. 1.

The position of device No. 2 is determined from the position of device No. 1 by a similar construction.

The measurement of the distance from each device to the generator of seismic waves constitutes a means for checking the validity of the preceding construction, which has been proven excellent in the exploration of straight profiles.

The measurement of the depth of submersion, which experience has shown may attain from 0 to 60 meters, permits the calculation of a correction to be applied to reduce the length of the seismic cable between successive devices. In the course of the exploration of a straight profile it has been verified that, in the absence of anomaly, the variations in the depth of immersion are continuous and the corresponding correction in length is generally less than a meter.

The measuring device are located in a plane by means of the geometric construction which has just been explained or by coordinates calculated in the same way, the positions of the seismic echo receivers being interpolated between the positions of said measuring devices.

This simplified geometric construction has been given purely by way of example and it is possible, by utilizing the three parameters measured, to obtain through an analytic method and a calculus of optimization, a very precise determination of the positions of the measuring devices.

What is claimed is:

1. A system for determining the position in space of a plurality of seismic echo receivers distributed along the length of a towed cable comprising, a plurality of measuring device receptacles secured to said cable among the receivers, and spaced from each other; each receptacle having zero floatability and stabilized along its horizontal axis, each receptacle containing angle measuring means for measuring the angle between the tangent to the cable at the location of said device and a fixed and known direction, means for controlling the occurance of an output from said measuring means, and means for coding and transmitting the value of the measurement, in the form of electronic pulses, to a utilization station via connector and conductor means;

each receptacle containing distance measuring means for measuring the distance separating said device from a generator of seismic waves, and means for coding and transmitting the values of the distance measurement, in the form of electronic pulses, to a utilization station via connector and conductor means; and each receptacle containing means for measuring the depth of immersion of said device, and means for coding and transmitting the values of the depth measurement in the form of electronic pulses to a utilization station via connector and conductor means.

2. System as claimed in claim 1 in which the means for measuring the angle between the tangent to the cable at the location of said device and a fixed and known direction comprises a potentiometric magnetic compass.

3. System as claimed in claim 1 in which the means for measuring the distance separating the seismic wave generator from the device comprises a hydrophone.

4. System as claimed in claim 1 in which the means for measuring the depth of said device comprises a potentiometric manometer.

5. System as claimed in claim 1 comprising means for measuring the distance between said device and a generator of seismic waves, and means for measuring the depth of said device, in which the means for controlling said measuring means and the means for coding and transmitting the values measured comprises a multiplex system including a plurality of reversible switch means, control modules for detecting orders and controlling said multiplex system, a filter and wave shaper for a wave transmitted directly by the water from the generator of seismic waves to the means for measuring distance, and a modulated variable frequency oscillator and its impedance adapter, said multiplex being adapted to successively connect said oscillator to the respective means for measuring the angle, the distance and the depth.

6. A process of determining the position in space of a plurality of seismic echo receivers distributed along the length of a towed cable, comprising the steps of:

measuring, by means of spaced apart measuring devices, among said plurality of said echo receivers, the angle between the tangent to the cable at the location of said measuring devices and a fixed and known direction;

determining the position in space of the said measuring devices, step by step, by assimilating the part of the towed cable located between two successive measuring devices to an arc of a circle, the length of which is known from the construction of the towed cable, while the angular value of the arc is determined from the differences between the angle measured by the successive measuring devices between the tangent to the cable and a fixed and known direction; and interpolating the positions in space of seismic echo receivers between the positions of the successive measuring devices along the towed cable.

7. Process as claimed in claim 6 which includes an additional step of measuring the depth of immersion of said measuring devices.

8. Process as claimed in claim 6 which includes an additional step of measuring to the distance from said measuring devices to a generator of seismic waves.

9. Process of determining the position in space of a plurality of seismic echo receivers distributed along the length of a towed cable, comprising the steps of:

measuring, by means of measuring devices among said plurality of said echo receivers, the angle between the tangent to the cable at the location of said measuring devices and a fixed and known direction;

determining, through an optimization process, a function corresponding to the best curve of the towed cable, taking into account the hydrodynamic conditions, having, at the position occupied by said devices, the value of the angle between the tangent to the cable at the location of said measuring device and a fixed and known direction, and the values of the fixed distances spacing the said devices along the length of the towed cable, said distances determined by the characteristics of the construction of the said towed cable;

obtaining the position in space of the measuring devices by means of the function thus determined for the best curve of the towed cable and the characteristics of construction of the said towed cable; and interpolating the position in space of the seismic echo receivers between the said devices along the curve thus determined, the distribution of the said seismic echo receivers along the towed cable being known.

10. A process as claimed in claim 9, which includes an additional step of measuring the depth of immersion of said measuring device.

11. A process as claimed in claim 9, which includes an additional step of measuring the distance from said measuring device to a generator of seismic waves.

* * * * *